United States Patent [19]

Pickard et al.

[11] Patent Number: 4,628,795
[45] Date of Patent: Dec. 16, 1986

[54] PISTON OF A PRESSURE-MEDIUM ACTUATOR WITH A PISTON ROD OF ADJUSTABLE EFFECTIVE LENGTH

[75] Inventors: Jürgen Pickard, Wernau; Helmut Sandner, Neuhausen; Klaus Lüttge, Fellbach, all of Fed. Rep. of Germany

[73] Assignee: Daimler-Benz Aktiengesellschaft, Stuttgart, Fed. Rep. of Germany

[21] Appl. No.: 698,794

[22] Filed: Feb. 6, 1985

[30] Foreign Application Priority Data

Feb. 9, 1984 [DE] Fed. Rep. of Germany ....... 3404546

[51] Int. Cl.$^4$ ............................................. F15B 15/24
[52] U.S. Cl. .................................... 92/13.41; 92/109
[58] Field of Search ................... 92/13.41, 13.4, 13.51, 92/13, 30, 13.7, 13.8, 109, 116; 403/326

[56] References Cited

U.S. PATENT DOCUMENTS

| 539,015 | 5/1895 | Fontneau | 403/326 |
| 1,390,078 | 9/1921 | Blain | 92/116 X |
| 1,771,219 | 7/1930 | Hein | 92/30 |
| 2,976,844 | 3/1961 | Goldring | 92/13.41 |
| 2,980,455 | 4/1961 | Rosback | 403/326 |
| 3,969,988 | 7/1976 | Maurer | 92/30 |
| 4,177,681 | 12/1979 | Wess | 92/13.41 |

FOREIGN PATENT DOCUMENTS 2620142 10/1977 Fed. Rep. of Germany ...... 403/326

Primary Examiner—Robert E. Garrett
Assistant Examiner—Mark A. Williamson
Attorney, Agent, or Firm—Barnes & Thornburg

[57] ABSTRACT

A piston for actuating a brake-band end of a transmission band system includes a piston for actuating a band in a transmission. The piston includes a piston body, and an elongated guide shaft having a proximal end fixed to one side of the piston body and a distal end defining a first annular support surface. The guide shaft is formed to include an axial bore having an opening in the first annular support surface. The piston further includes a piston rod having an outer end for engaging the transmission band, an inner end for reception in the axial bore, and a second annular support surface situated to confront the first annular support surface when the inner end of the piston rod is received in the axial bore of the elongated guide shaft. An O-ring is positioned along the inner end of the piston rod, to retain the inner end within the axial bore of the elongated shaft. At least one spacer mean is situated intermediate the first and second annular support surfaces to separate the annular support surfaces to vary the effective length of the piston rod.

11 Claims, 2 Drawing Figures

PISTON OF A PRESSURE-MEDIUM ACTUATOR WITH A PISTON ROD OF ADJUSTABLE EFFECTIVE LENGTH

BACKGROUND AND SUMMARY OF THE INVENTION

The invention relates to a piston usable to actuate transmission bands, and particularly to a piston of a pressure-responsive actuator having a piston rod of adjustable effective length.

In a known piston of this type (U.S. Pat. No. 3,554,057), the receiving bore per se is open at both ends, and a threaded bolt is screwed into the receiving bore, as a stop for the piston rod, from the mouth located opposite the piston-rod end designed as a thrust piece, and is secured by means of a lock nut. So that aluminum can be used as the material for the piston, the guide having the threaded portion for the stop and the actual piston body have to be made in two parts, and at least an additional retaining ring is necessary for fixing the guide and piston body relative to one another.

In known pistons of a different type, in which either no guide or a guide integral with the housing is used and the piston rod is not adjustable in terms of its effective length, the piston and piston rod are either screwed (U.S. Pat. No. 3,327,554) or riveted (special issue of ATZ Automobiltechnische Zeitschrift, 72nd year, numbers 7 and 9, 1970 Franckh's sche Verlagshandlung Stuttgart, page 12, FIG. 26). The stock-keeping of these known pistons involves a high outlay, because a large number of piston rods of different lengths have to be kept in stock.

The disadvantage of expensive stock-keeping is also a characteristic feature of a known brake-band actuation system of a different type (German Unexamined Published Patent Application 3,012,611), in which tolerances are compensated by the selection of a reaction thrust piece of suitable effective length from a plurality of reaction thrust pieces of different lengths. In this case, the reaction thrust piece is inserted operatively between the gear box housing and one brake-band end, while a piston acts in turn on the other brake-band end by means of a nonadjustable piston rod which slides in guide integral with the housing and which is fixed to the piston in one axial direction by means of a retaining ring. There also operates in the cylinder housing of the piston a spring-loaded release piston, through which the piston rod passes displaceably and which needs to be sealed off in a pressure-tight manner from both the inner wall of the cylinder housing and the piston rod.

The object on which the invention is based is essentially to provide a piston which has a piston rod of adjustable effective length and which is distinguished by a low outlay in terms of construction. An important advantage of the piston according to the present invention is that the effective length is fixed by means of the compensating washer or compensating washers, in such a way that it is not possible to vary it by breaking the connection between the piston and the piston rod, as is the case in the known piston with a threaded bolt as a stop for the piston rod, when the threaded bolt is rotated after the lock nut has been released. A new measuring and adjusting operation is then necessary on the known piston. A further advantage is simply handling when play is compensated in production.

According to preferred embodiments of the present invention, a piston for actuating a brake-band end of a transmission band system includes a piston for actuating a band in a transmission. The piston includes a piston body, and an elongated guide shaft having a proximal end fixed to one side of the piston body and a distal end defining a first annular support surface. The guide shaft is formed to include an axial bore having an opening in the first annular support surface. The piston further includes a piston rod having an outer end for engaging the transmission band, an inner end for reception in the axial bore, and a second annular support surface situated to confront the first annular support surface when the inner end of the piston rod is received in the axial bore of the elongated guide shaft. An O-ring is positioned along the inner end of the piston rod, to retain said inner end within the axial bore of the elongated shaft. At least one spacer mean is situated intermediate the first and second annular support surfaces to separate said annular support surfaces to vary the effective length of the piston rod.

Further objects, features, and advantages of the present invention will become more apparent from the following description when taken with the accompanying drawings which show, for purpose of illustration only, an embodiment in accordance with the present invention.

DETAILED DESCRIPTION OF THE DRAWINGS

Figure 1:
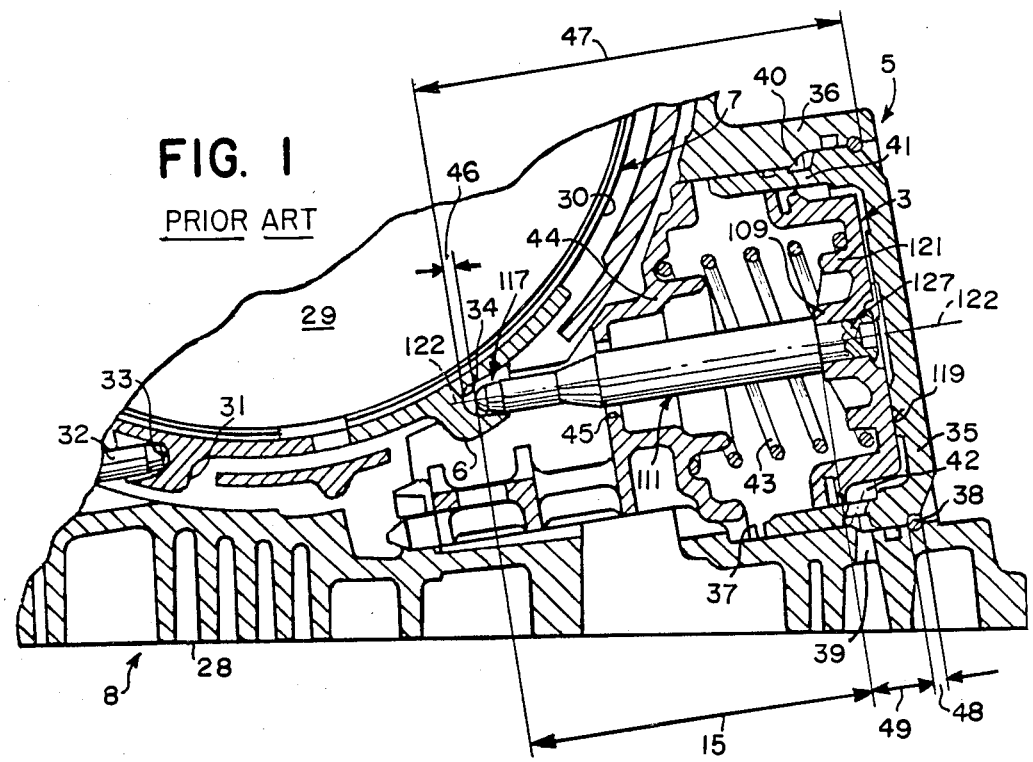
FIG. 1 shows a partial cross section through a gear box housing in a plane containing the piston axis of a pressure-responsive actuator with a conventional piston according to the state of the art.

With reference to FIG. 1, all that is shown of a planetary change gear 8 is a cut-out of a lower housing part 28 which is intended for the connection of the conventional control plate and in which is received a pressure-responsive actuator 5 for actuating a gearshift brake 7. The gearshift brake 7 includes a brake drum 29 connected fixedly in terms of rotation to a transmission member of the change gear and of a brake band 30 which is looped once round the brake drum 29 and one brake-band end 6 which is actuated by the actuator 5, while the other brake-band end 31 is supported via a reaction thrust piece 32 against the housing part 28. The brake-band end 31 is provided with a pocket-shape receptacle 33 for the engagement of the reaction thrust piece 32, just as the brake-band end 6 has a pocket-shaped receptacle 34 for the engagement of thrust piece 117 formed by the outer end of a piston rod 111, the inner end 127 of which is riveted to a central hub 109 of a piston body 121, so that the piston rod 111 and piston body 121 together form a piston 3 of the actuator 5. The piston 3 operates by being axially displaceable in a cup-shaped cylinder insert 35 which is inserted into a cylindrical stepped receiving bore 37 of a housing extension 36 of the housing part 28 and which is fixed, in the direction of the piston or cylinder axis 122-122 pointing away from the brake-band end 6, by a retaining ring 38 inserted into a peripheral groove of the receiving bore 37. A housing-pressure channel 39, communicating in a way not shown in any more detail with the hydraulic shift and control mechanism of the change gear 8, opens into an annular space 40 of the receiving bore 37, this annular space being limited on the one hand by the housing extension 36 and on the other hand by the cylinder insert 35. The annular space 40 is connected via radial connecting bores 41 in the cylinder insert 35 to the working-pressure chamber 42 of the actuator 5 enclosed between the piston 3 and the cylinder insert 35 so that the respective end face 119 of the piston 3 can be subjected to the pressure of the housing-pressure channel 39. In the direction of the cylinder axis 122-122 pointing toward the brake-band end 6, the piston 3 is supported on a release spring 43 which is itself supported on an abutment insert 44 resembling a spring plate, which closes off the receiving bore 37 on the inside and which has a central through-orifice 45 for the passage of the piston rod 111.

When the working-pressure chamber 42 is relieved of pressure, the release spring 43 retains the piston 3 in the release position shown, in which the thrust piece 117 executed an idle stroke 46 relative to its associated pocket-shaped receptacle 34, when the brake-band end 6 rests against the brake drum 29. The idle stroke 46 is fixed during assembly in the following way:

First, the distance 47 between the outer edge of the peripheral groove of the retaining ring 38 and the receptacle 34, when the brake-band end 6 rests against the brake drum 29, is determined. The effective length 15 of the piston rod 111 is obtained when the fixed values for the idle stroke 46, the outside diameter 48 of the retaining ring 38 and for the hub length 49 are subtracted. The piston rod suitable for the length value determined can now be selected from a plurality of piston rods 11 with different effective lengths 15 which are prefabricated together with the piston body 121. The design and method of assembly of the piston 3 according to FIG. 1 belong to the state of the art.

Figure 2:
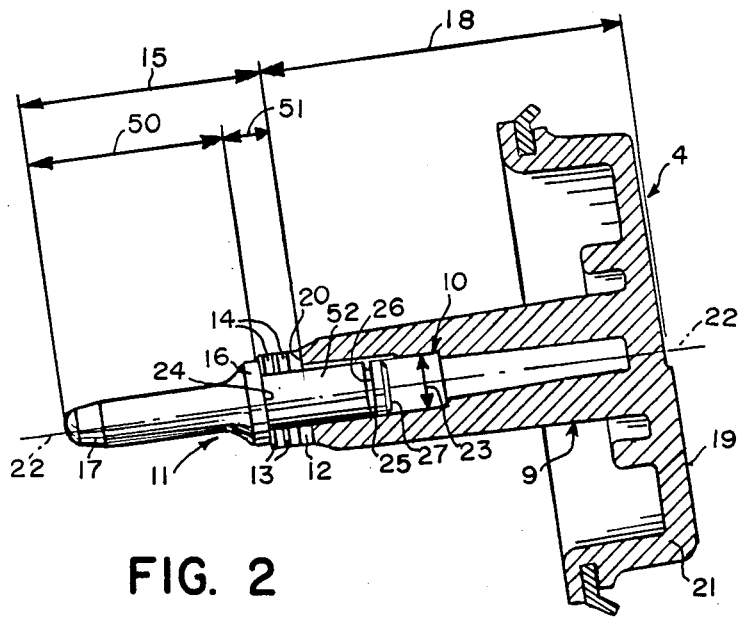
FIG. 2 shows, on a larger scale, a sectional view of an embodiment of a piston arrangement according to the present invention which can be used for the actuator of FIG. 1.

The piston 4 according to the present invention, shown in FIG. 2, differs fundamentally from this in that its piston body 21 is made in one piece with a central guide 9 having an axial receiving bore 10, and only a single piston design 11, but one or more annular compensating washers 12 to 14, are used for different actual values of the distance 47. The compensating washers 12 to 14 are arranged concentrically on a guide portion 52 of the piston rod 11, this guide portion being insertable into the receiving bore 10, and clamped axially between annular supporting surfaces 20 and 24 on the end face of the guide 9, on the one hand, and end face, turned toward it, of a collar 16 of the piston rod 11, on the other hand. On the piston 4, it is also advantageous if the distance 18 between the end face 19, which can be subjected to the working pressure, and the end face or the supporting surface 20 of the guide 9 amounts in the direction of the piston axis 22-22 to a multiple of the guide diameter 23 of the receiving bore 10. On the piston 4, it is also important, for assembly reasons, that the piston rod 11 should be held captive in the receving bore 10 in a simple way by means of an O-ring 25 resting in a peripheral groove 26 at the inner end 27 of the piston rod 11, the outer end of which is again designed as a thrust piece 17 for engagement in the receptable 34 of the brake-band end 6.

If it is assumed that, in the release position of the piston 4, the end face 19 of the piston body 21, which end face can be subjected to the working pressure, lies approximately in a common plane with the axially inner edge of the peripheral groove of the retaining ring 38, again in the same way as the corresponding end face 119 of the piston 3 in FIG. 1, then the distance 51 to be compensated on the piston 4 is again obtained first by determining the distance 47, as described with reference to FIG. 1. The outside diameter 48 (FIG. 1) of the retaining ring 38, the distance 18 (FIG. 2) between the end faces 19 and 20 and the distance 50 between the supporting surface 24 and the outer end (thrust piece 17) of the piston rod 11 must be subtracted from this dimension as fixed length dimensions. The measures for length compensation are carried out directly on the assembly line.

In the exemplary embodiment of FIG. 2, compensating washers in three different thicknesses are used, specifically a compensating washer 12 with a thickness of, for example, 1.5 mm, two compensating washers 13 approximately 0.5 mm thick and two compensating washers approximately 1.0 mm thick; such compensating washers are standardized.

To simplify stock-keeping, it is also contemplated to use only compensating washers of the same thickness dimension or of two different dimensions.

Although the invention has been described in detail with reference to certain preferred embodiments and specific examples, variations and modifications exist within the scope and spirit of the invention as described and defined in the following claims.

What is claimed is:

1. An arrangement for actuating a brake-band in a transmission, the arrangement comprising:
    a piston body,
    an elongated guide shaft having a proximal end fixed to one side of the piston body and a distal end defining a first annular support surface, the guide shaft being formed to include an axial bore having an opening in the first annular support surface,
    a piston rod including an outer end for engaging the transmission band, an inner end for reception in the axial bore, and a second annular support surface situated to confront the first annular support surface when the inner end of the piston rod is received in the axial bore of the elongated guide shaft,
    a retaining means, positioned along the inner end of the piston rod, for retaining said inner end within the axial bore of the elongated guide shaft, and
    spacer means, situated intermediate the first and second annular support surfaces, for separating said annular support surfaces to vary the effective length of the piston rod.

2. The arrangement of claim 1, wherein the spacer means includes at least one annular washer arranged concentrically on the piston rod.

3. The arrangement of claim 1, wherein the piston rod further includes a collar shaped to define the second annular supporting surface.

4. The arrangement of claim 1, wherein the piston rod includes a guide portion intermediate the second annular support surface and the inner end of the guide portion being formed to include a circumferential groove, and the retaining means includes a resilient O-ring for reception in the circumferential groove of the guide portion.

5. The arrangement of claim 1, wherein said piston body includes an end face surface, the distance between said face surface and said first annular support surface of said guide shaft is a multiple of a selected diameter of said axial bore.

6. The arrangement of claim 5, wherein the piston body and the elongated guide shaft are made in one piece, said end face of said piston body being subjected to a working pressure.

7. A pressure-responsive actuator arrangement for actuating a brake-band end of a gear-shift brake of an automatic planetary change gear, having a piston and piston rod, the outer end of said piston rod being designed as a thrust element for engagement on the brake-band end, the arrangement comprising:

said piston having a central guide shaft with an axial receiving bore of a selected diameter for the retention of said piston rod, at least one annular spacer means arranged concentrically relative to the piston rod and axially between a first annular supporting surface of said guide shaft and a second annular supporting surface of said piston rod, and an O-ring positioned in a peripherial groove formed on said piston rod for securely retaining a part of said piston rod in said guide shaft.

8. An arrangement of claim 7, wherein said piston includes a piston body having an end face surface, wherein the distance between said end face surface of said piston body and said first annular supporting means of said guide shaft is equal to a multiple of said selected diameter of the receiving bore, said distance being aligned in the direction of the piston axis.

9. The arrangement of claim 8, wherein said end face of said piston body can be subjected to a working pressure, and said piston body and said guide shaft are made in one piece.

10. The arrangement of claim 8, wherein the piston rod has a collar which defines the second annular support surface.

11. The arrangement of claim 8, wherein said end face of the guide shaft defines said first annular support surface.

* * * * *